United States Patent [19]

Lee

[11] Patent Number: 5,704,885
[45] Date of Patent: Jan. 6, 1998

[54] TOOL POT FOR USE IN AN AUTOMATIC TOOL CHANGER

[75] Inventor: Dong Jin Lee, Masan, Rep. of Korea

[73] Assignee: Daewoo Heavy Industries Ltd., Incheon, Rep. of Korea

[21] Appl. No.: 661,475

[22] Filed: Jun. 11, 1996

[30] Foreign Application Priority Data

Jun. 20, 1995 [KR] Rep. of Korea ............. 95-16439

[51] Int. Cl.⁶ .................................................. B23Q 3/157
[52] U.S. Cl. ........................................... 483/62; 483/65
[58] Field of Search ................................. 483/60–68, 58, 483/57; 211/1.51, 1.52, 1.53, 1.55

[56] References Cited

U.S. PATENT DOCUMENTS

| | | | |
|---|---|---|---|
| 4,117,586 | 10/1978 | Uchtida et al. | 483/65 X |
| 4,296,541 | 10/1981 | Tsuboi et al. | 483/39 X |

FOREIGN PATENT DOCUMENTS

| | | | |
|---|---|---|---|
| 2366097 | 6/1978 | France | 483/62 |
| 14870 | 5/1972 | Japan | 483/62 |
| 117038 | 6/1986 | Japan | 483/62 |
| 136750 | 6/1986 | Japan | 483/65 |
| 92237 | 4/1991 | Japan | 483/62 |

*Primary Examiner*—William R. Briggs
*Attorney, Agent, or Firm*—Staas & Halsey

[57] ABSTRACT

A tool pot is carried by a rotatable pot carrier of a tool magazine to hold a cutting tool with a tail end portion. Swingable between a rest position and an operative position, the tool pot includes a body having an axial tapering bore, an axial end bore for reception of the tail end portion of the cutting tool and a plurality of radial holes each open into the axial end bore at their inner ends. A gripper is provided in the radial holes of the body for releasably gripping the tail end portion of the cutting tool during the time the cutting tool remains held in the tool pot. Built in the body is a tool lock that cooperates with the gripper to lock the cutting tool against removal during the time the tool pot is at the rest position and is caused to swing.

10 Claims, 4 Drawing Sheets

5,704,885

TOOL POT FOR USE IN AN AUTOMATIC TOOL CHANGER

FIELD OF THE INVENTION

The present invention is generally directed to an automatic tool changer of machine tools for changing a cutting tool held in a spindle head with a new one in a fully automated fashion and, more specifically, to a tool pot for use in the automatic tool changer that can lend itself to hold firmly the cutting tool against any unwanted drop out of the tool pot in the tool changing process.

DESCRIPTION OF THE PRIOR ART

Extensive use has been made of an automatic tool changer in the art of machine tools so as to enable the tool changing task to be carried out without resort to human intervention. The conventional tool changer is typically provided with a tool magazine, whether chain type or drum type, having a succession of horizontally extending tool pots movable along a predefined trace. Each of the tool pots is adapted to removably receive cutting tools of different configurations in a condition ready for use. The tool magazine may be rotatingly driven such that one of the tool pots carrying a target tool can be brought into a reference index position in preparation for the tool changing operation.

Located in the vicinity of the reference index position with an appropriate distance from the frontal edge of the tool magazine is a relay pot that can be swung about a pivot axis between a horizontal position wherein the longitudinal axis of the relay pot runs parallel to those of the tool pots and a vertical position wherein the relay pot extends downward at a right angle relative to the tool pots of the tool magazine. When the relay pot is in the vertical position, the longitudinal axis of the relay pot runs in parallel with the rotational axis of a spindle head. Such a swinging movement of the relay pot may be caused by the combination of a rack and pinion which in turn is operatively associated with a hydraulic swing cylinder.

A tool transfer unit should be employed to bring the cutting tool in the tool pot up to the relay pot and vice versa. The tool transfer unit is designed to first pull the cutting tool out of the tool pot, then transport it up to the relay pot and finally insert it into the relay pot kept at the horizontal position. These series of tool transfer actions may be referred to as a tool supply process in the sense that a fresh tool is on the way of moving toward the spindle head for the next cutting operation. The Tool transfer actions will take place in the reverse order when a tool recovery process proceeds with a view to return a post-use cutting tool back to the empty tool pot of the tool magazine.

Just after the fresh tool has been transferred to the relay pot in the tool supply process, the relay pot is caused to swing at a right angle and assume the vertical position so that the fresh tool carried by the relay pot comes into parallel alignment with the post-use tool firmly held on the spindle head. Subsequently, the fresh tool will change its position with the post-use tool by virtue of a changer arm which remains rotatably and extendibly attached to a machine tool frame. To be more specific, the changer arm is adapted to rotate 60° in the forward direction from a rest position into simultaneous engagement with the fresh and post-use tools at its opposite free ends. Causing the changer arm to be extended downwards will result in the fresh and post-use tools being coincidently pulled out of the relay pot and the spindle head.

The next step is to have the changer arm subjected to a further 180° rotation, whereby the fresh and post-use tools are replaced with each other. Retraction of the changer arm in this state will put the post-use tool into the relay pot and the fresh tool into the spindle head. The post-use tool is then transferred to the empty tool pot of the tool magazine, while the changer arm is brought into the rest position to thereby terminate the tool changing process.

Meanwhile, the relay pot set forth above includes a number of, e.g., four, equally spaced, spring-loaded balls that should be urged against the corresponding dimples or indentations on the neck of the cutting tool accommodated in the relay pot. A key role of the spring-loaded balls lies in resiliently gripping the cutting tool until and unless the cutting tool is forcibly pulled out of the relay pot by the changer arm in the tool supply process or by the tool transfer unit in the tool recovery process.

To facilitate understanding of the prior art as well as the invention, the location of certain parts will be identified by reference to clock position in the description which is to follow. Each of the balls is radially movably retained in the respective one of first through fourth radial holes which are arranged at 3:00, 6:00, 9:00 and 12:00 positions on the cross-sectional plane of the relay pot. The first and third radial holes extend in parallel with the pivot axis of the relay pot, while the second and fourth radial holes run perpendicular thereto.

Slidably inserted through each of the second and fourth radial holes is a push pin that remains, at its outer end, contacted with a cam surface on the tool changer frame and, at its inner end, confronts the corresponding ball with a compression spring interposed therebetween. The profile of the cam surface is such that, when the relay pot is in the horizontal position, the push pin may be allowed to move away from the ball under the force of the compression spring to thereby leave the cutting tool unlocked. But the push pin may be depressed inwards by the cam surface to push the ball into locking engagement with the corresponding dimple of the cutting tool during the time and after the relay pot gets rotated into the vertical position. Such a caming action help prohibit the cutting tool from unwanted drop or removal out of the relay pot, which otherwise would take place due to the centrifugal force exerting on the cutting tool in the course of swinging movement of the relay pot.

By use of the prior art automatic tool changer referred to hereinabove, there would be provided a distinct advantage that the cutting tool is made immune to unwanted drop and resultant damage throughout the tool changing process, especially during the period of up-swing and down-swing of the relay pot. This means that it becomes possible to speed up the swinging movement of the relay pot and, eventually, to shorten somewhat the overall tool changing time. Disadvantageously, however, the prior art automatic tool changer cannot avoid the use of the relay pot and the tool transfer unit to bring the cutting tool in the tool pot up to the changer arm or vice versa. Unavoidability of employing the relay pot and the tool transfer unit shall make the automatic tool changer costly and complicated in structure. Another undesirable aspect of the prior art tool changer lies in that the tool changing time is still significantly prolonged due largely to the involvement of the tool transferring and relaying steps.

SUMMARY OF THE INVENTION

It is an object of the invention to provide a tool pot for use in an automatic tool changer which eliminates the need to use a tool transfer unit and a tool relay pet and is capable of keeping a cutting tool locked in the tool pot except where the tool pot is at an operative position.

With this object in view, the present invention provides a tool pot carried by a rotatable pot carrier of a tool magazine to releasably hold a cutting tool formed with a tail end portion. The tool pot is swingable between a rest position and an operative position and includes a body having an axial tapering bore, an axial end bore for reception of the tail end portion of the cutting tool and a plurality of radial holes each open into the axial end bore at their inner ends. A gripper is provided in the radial holes of the body for yieldably gripping the tail end of the cutting tool during the time the cutting tool remains held in the tool pot. Built in the body is a tool lock that cooperates with the gripper to lock the cutting tool against removal during the time the tool pot is caused to swing between the rest position and the operative position.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
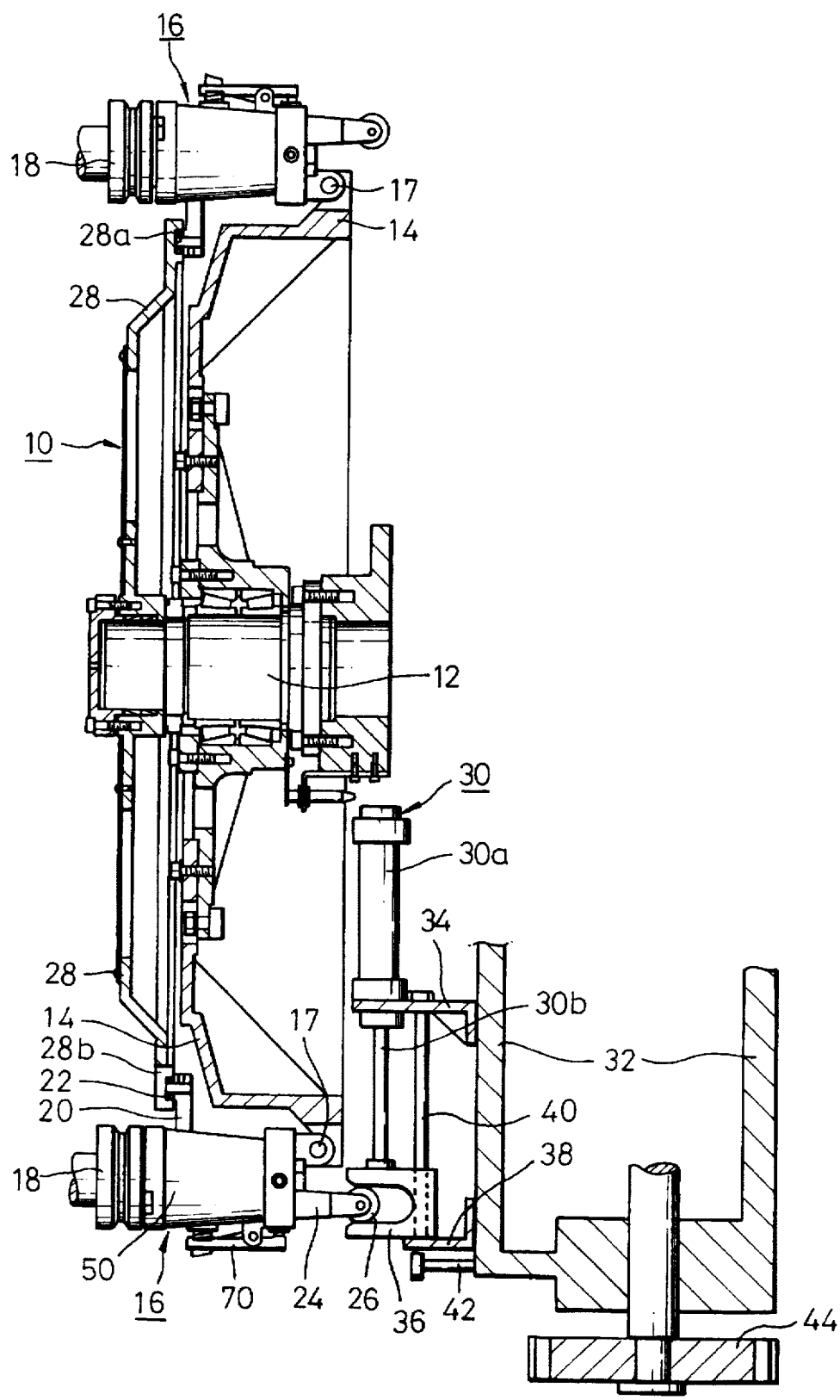
FIG. 1 shows an automatic tool changer incorporating the tool pot in accordance with the invention, with certain portions thereof removed for simplicity.

Referring now to FIG. 1, there is shown an automatic tool changer which incorporates the tool pot in accordance with the invention. It can be seen in FIG. 1 that the automatic tool changer includes a tool magazine 10 provided with a support shaft 12 extending in a horizontal direction to rotatably support a drum-type pot carrier 14. A succession of tool pots 16 holding different types of cutting tools 18 are swingably attached by hinge pins 17 to the peripheral edge of the pot carrier 14 at uniformly spaced, multiple index positions. One of the index positions, e.g., the lowermost position in FIG. 1 is referred to herein as "reference index position", inasmuch as the tool changing operation would be performed only for the tool pot 16 lying in the reference index position. The pot carrier 14 may be rotatingly driven about the support shaft 12 by a suitable drive means not shown in the drawings such that the tool pot 16 holding the cutting tool 18 to be changed next time can be brought into the reference index position.

It should be noted that the tool pot 16 is provided with a side finger 20 having a roller 22 at its distal end and a tail finger 24 carrying a roller 26 at the terminal end thereof. Fixedly secured to the frontal end of the support shaft 12 is a guide plate 28 which has a guide groove 28a making a sliding engagement with the roller 22 of the side finger 20 to prevent any pivotal movement of the tool pot 16 at an index position other than the reference index position and to guide the indexing movement of the tool pot 16 between the multiple index positions. The guide plate 28 is further provided with a cutout 28b in an exact alignment with the reference index position. Due to the provision of the cutout 28b on the guide plate 28, the side finger 20 on the tool pot 16 would be no longer restrained by the guide plate 28 at the reference index position and, therefore, the tool pot 16 becomes capable of swinging about the hinge pin 17 between a horizontal rest position as illustrated in FIG. 1 and a vertical operative position not depicted in FIG. 1.

Such a swinging movement of the tool pot 16 may be caused by virtue of a swing cylinder 30 which has a cylinder housing 30a affixed to a rigid frame 32 with a top mounting bracket 34 and a cylinder red 30b retractably fitted to the cylinder housing 30a. A generally U-shaped up/down head 36 is mounted at the free end of the cylinder rod 30b so as to engage with the roller 26 of the tail finger 24 on the tool pot 16. In a spaced-apart, parallel relationship with the top mounting bracket 34, a bottom mounting bracket 38 is fixedly secured to the frame 32 to support a guide rod 40 which runs parallel with the cylinder rod 30b and passes through the up/down head 36. Located just beneath the bottom mounting bracket 38 is a stopper bolt 42 that coacts with the tool pot 16 in a manner as fully set forth hereinbelow. In addition, a changer arm 44 is extendibly and rotatably mounted to the frame 32 and serves to remove the cutting tool 18 out of the tool pot 16 for delivery to a spindle head (not shown) of a machine tool as well as to remove the cutting tool 18 out of the spindle head for recovery to the tool pot 16. Since the operation of the changer arm 44 is considered highly conventional, no further description will be offered in this regard.

Figure 2:
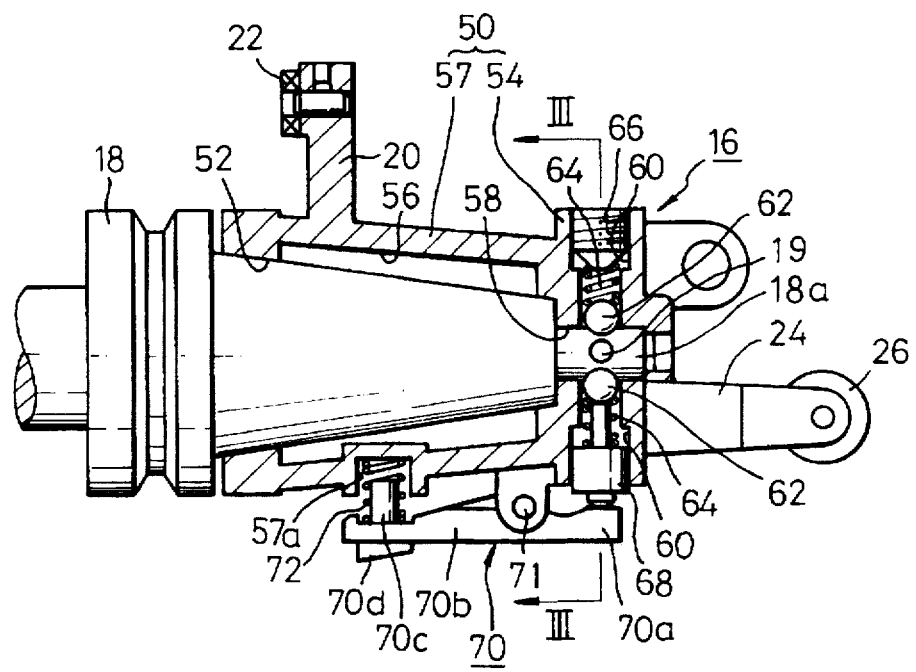
FIG. 2 is a sectional view illustrating the inventive tool pot which has the ability to selectively lock a cutting tool against removal out of the tool pot.
Figure 3:
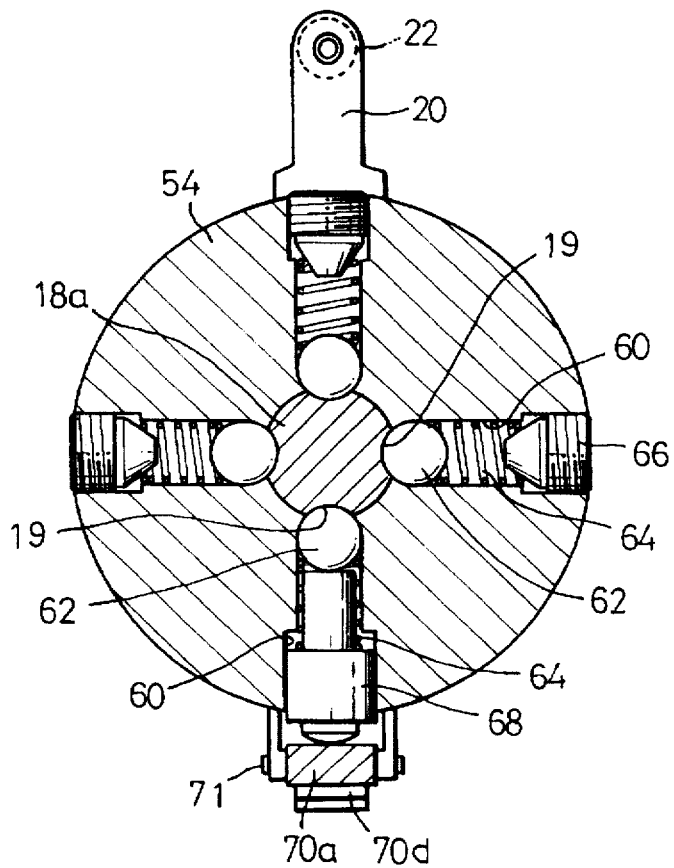
FIG. 3 is an enlarged, cross-sectional view taken along line III—III in FIG. 2 and best showing the cutting tool locked against removal in the tool pot.

As best shown in FIGS. 2 and 3, the tool pot 16 includes a hollow body 50 which is open at its front end to provide a tool access aperture 52 and closed at its rear end with a rear wall 54. The body 50 has an axial tapering bore 56 defined by a cylindrical side wall 57, an axial end bore 58 extending through the rear wall 54 for reception of the tail end portion 18a of the cutting tool 18 and a plurality of, e.g., four, radial holes 60 each open into the axial end bore 58 at their inner ends. Around the tail end portion 18a of the cutting tool 18, four dimple or indentations 19 are provided at an equal spacing so that they can be brought into an alignment with the corresponding radial holes 60 upon insertion of the cutting tool 18 into the axial tapering bore 56 and the axial end bore 58.

As can be seen in FIG. 3, the radial holes 60 are respectively located at the 3:00, 6:00, 9:00 and 12:00 positions on the cross-sectional plane of the rear wall 54. In the illustrated embodiment, a gripper ball 62 is inserted in the inner extension of the respective one of the radial holes 60, with a compression spring 64 retained radially outwardly of the corresponding gripper ball 62 for the sake of urging the gripper ball 62 into engagement with the corresponding dimple 19 of the cutting tool 18 to removably grip the tail end portion 18a thereof. It should be appreciated that the 3:00, 9:00 and 12:00 radial holes 60 are closed at their outer extensions by means of adjustable plugs 66. Each of the adjustable plugs 66 is threadedly engaged with the corresponding radial hole 60 in such a manner that it can be either tightened or loosened to adjust the biasing force of the compression spring 64 against the gripper ball 62. In the meantime, a slider pin 68 is fitted into the 6:00 radial hole 60 for sliding movement with respect to the corresponding gripper ball 62 between a retracted position and an extended position.

Referring again to FIG. 2, a release lever 70 is pivoted to the side wall 57 or the body 50 at an intermediate fulcrum for pivotal movement about a pivot pin 71 between a locking position wherein the release lever 70 continues to push the slider pin 68 toward the retracted position to bring the gripper ball 62 into locking engagement with the dimple 19 on the tail end portion 18a of the cutting tool 18 and an unlocking position wherein the slider pin 68 is allowed to move toward the extended position to bring the gripper ball 62 out of locking engagement with the cutting tool 18. The release lever 70 is provided with a first arm portion 70a kept in contact with the slider pin 68 at its free end and a second arm portion 70b extending in the opposite direction from the first arm portion 70a with a length greater than that of the first arm portion 70a. It will be preferred that the length of the second arm portion 70b be about twice as great as that of the first arm portion 70a whereby the pushing force of the release lever 70 acting on the slider pin 68 would be doubled under the principle of leverage.

The release lever 70 is further provided at the free end of the second arm portion 70b with a boss 70c protruding toward the side wall 57 of the body 50 and an abutment lug 70d extending in the opposite direction from the boss 70c. A recess 57a is formed on the side wall 57 in alignment with the boss 70c to hold a repulsion spring 72 in place. One end of the repulsion spring 72 is received in the recess 57a, the other end being retained by the boss 70c, thus rendering the repulsion spring 72 free from escapement. The constant of the repulsion spring 72 should be preferably large enough to maintain the release lever 70 in the locking position throughout the swinging process of the tool pot 16. The abutment lug 70d is adapted to be in contact with and depressed by the stopper bolt 42 shown in FIG. 1 when the tool pot 16 is in the vertical operative position, so that the release lever 70 can be rotated clockwise against the repulsion spring 72.

In operation, the tool pot 16 holding a cutting tool 18 to be used next time should first be brought into the reference index position, i.e., the lowermost position in FIG. 1, by way of rotating the pot carrier 14 about the support shaft 12. The roller 26 of the tail finger 24 gets engaged with the up/down head 36 of the swing cylinder 30 as the tool pot 16 moves into the reference index position. Since the cylinder rod 30b of the swing cylinder 30 remains extended at this moment, the tool pot 16 will be kept in the horizontal rest position as clearly illustrated in FIG. 4. The release lever 70 is in the locking position under the action of the repulsion spring 72, assuring that the slider pin 68 be pushed toward the retracted position to bring the gripper ball 62 in the 6:00 radial hole into locking engagement with the dimple 19 on the tail end portion 18a of the cutting tool 18. At this time, the remainder gripper balls in the 3:00, 9:00 and 12:00 radial holes will cooperate with the 6:00 gripper ball to keep the cutting tool locked in place.

Figure 5:
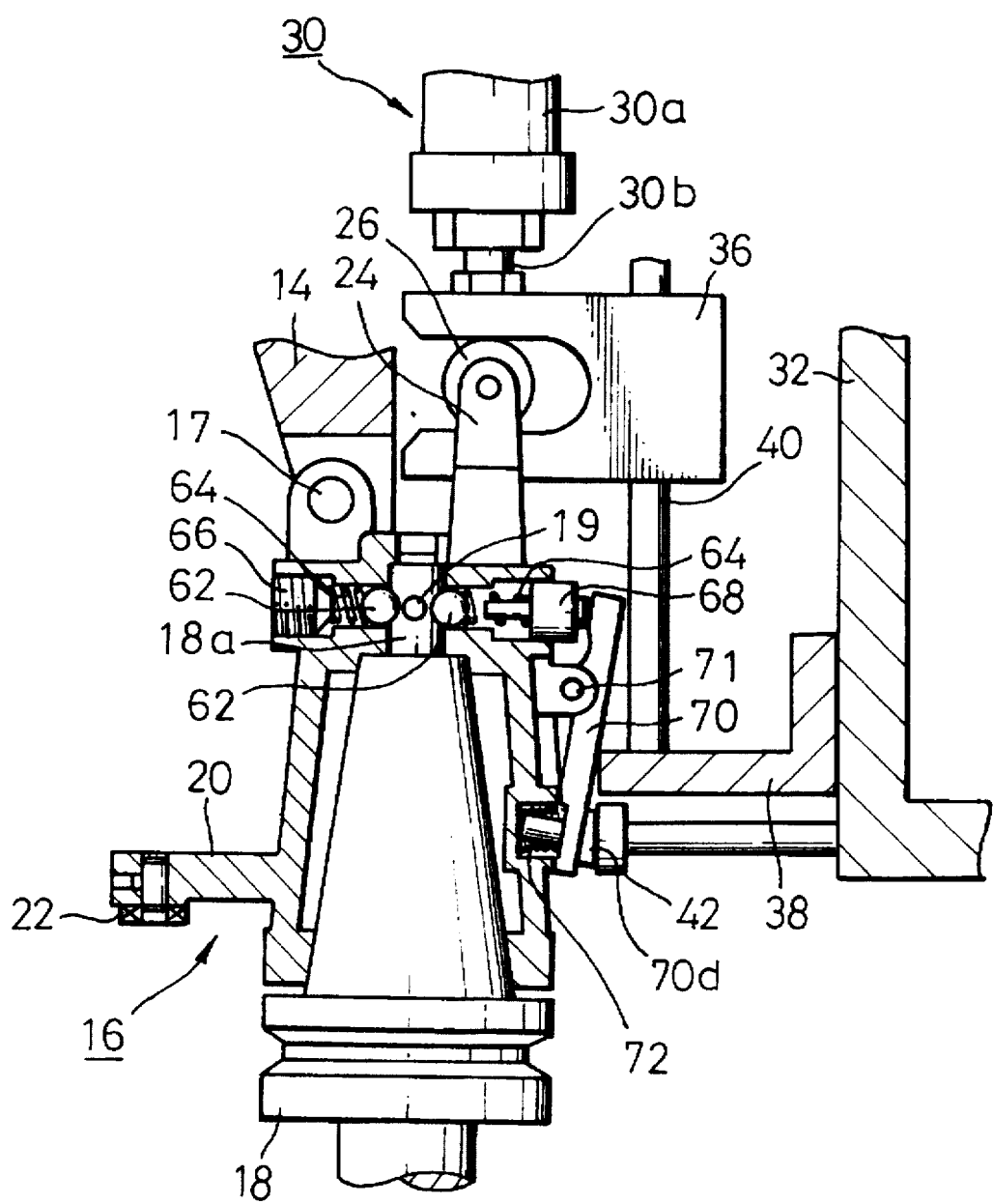
FIG. 5 depicts the tool pot swung into a vertical operative position, with the cutting tool unlocked into a condition for removal.

Retraction of the cylinder rod 30b in the condition noted just above will cause the tool pot 16 to swing counterclockwise about the hinge pin 17 into the vertical operative position as illustrated in FIG. 5. Throughout the swinging process of the tool pot 16, the cutting tool 18 continues to be locked by the combination of the gripper ball 62, the slider pin 68, the release lever 70 and the repulsion spring 72. This means that the cutting tool 18 would be prohibited from any unwanted removal or drop out of the tool pot 16 in spite of the centrifugal force applied to the cutting tool 18 in the swinging process. As the tool pot 16 comes to assume the vertical operative position at the termination of retracting movement of the swing cylinder 30, the release lever 70 will make a contact with the stopper bolt 42 at the abutment lug 70d thereof, which in turn would depress the release lever 70 against the repulsion spring 72, thereby causing the release lever 70 to rotate clockwise about the pivot pin 71. The result is that the slider pin 68 is allowed to move toward the extended position away from the gripper ball 62, whereby the cutting tool 18 is unlocked from the tool pot 16 and merely gripped by the gripper ball 62 in a removable state.

Figure 4:
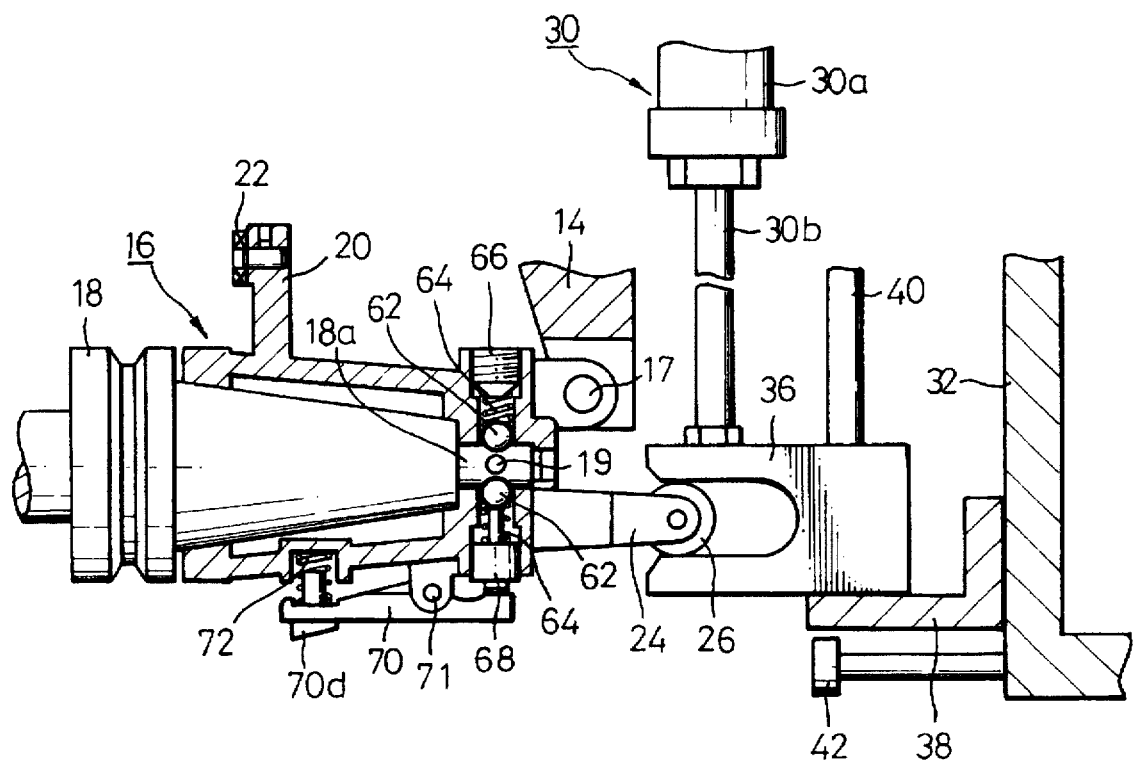
FIG. 4 represents the tool pot kept in a horizontal rest position and the cutting tool locked against removal in the tool pot.

In the subsequent process, the changer arm 44 schematically shown in FIG. 1 will be caused to rotate into simultaneous engagement with the cutting tools 18 on the tool pot 16 and on the spindle head not shown in the drawings. The cutting tools 18 are then removed from the tool pot 16 and the spindle head and changed with each other by the changer arm 44 in a manner well known in the art of machine tools. As soon as the tool pot 16 receives the cutting tool 18 from the spindle head, the swing cylinder 30 will be extended again in order to return the tool pot 16 back to the horizontal rest position as shown in FIG. 4. It should be noted that the cutting tool 18 remains locked against removal in the course of return swinging of the tool pot 16 and at the horizontal rest position.

While the invention has been shown and described with reference to a preferred embodiment, it should be apparent to one of ordinary skill that many changes and modifications may be made without departing from the spirit and score of the invention as defined in the claims.

What is claimed is:

1. A tool pot carried by a rotatable pot carrier of a tool magazine in an automatic tool changer for use in holding a cutting tool with a tail end portion, the tool pot swingable between a rest position and an operative position, comprising:

a body swingably attached to said pot carrier and having an axial tapering bore, an axial end bore for reception of the tail end portion of the cutting tool and a plurality of radial holes each open into the axial end bore at their inner ends;

means provided in the radial holes of said body for releasably gripping the tail end portion of the cutting tool; and locking means built to said body, said locking means comprising a slider fitted to one of the radial holes for sliding movement with respect to the tail end portion of the cutting tool, means pivoted to said body for pivotal movement between a locking position wherein said pivotal movement means pushes the slider radially inwards to lock the cutting tool and an unlocking position wherein said slider is allowed to move radially outwards to unlock the cutting tool, and means for normally urging said pivotal movement means into the locking position.

2. The tool pot as recited in claim 1, wherein said gripping mans comprises a gripper ball and a compression spring retained in a respective one of the radial holes of said body, said compression spring positioned radially outwardly of the gripper ball to normally bias the gripper ball into engagement with the tail end portion of the cutting tool.

3. The tool pot as recited in claim 1, wherein said pivotal movement means is provided with a first arm portion kept in contact with said slider at its free end and a second arm portion extending in the opposite direction from the first arm portion with a length greater than that of the first arm portion.

4. The tool pot as recited in claim 3, wherein said length of the second arm portion is about twice as great as that of the first arm portion.

5. The tool pot as recited in claim 3, wherein said second arm portion of the pivotal movement means has a boss protruding toward said body to hold said urging means in place and an abutment lug extending in the opposite direction from the boss, and wherein said body has a recess in alignment with the boss of the second arm portion to receive said urging means.

6. The tool pot as recited in claim 2, further comprising a plurality of adjustable plugs respectively threadedly engaged with the radial holes of said body other than the radial hole receiving the slider of said locking means.

7. An automatic tool changer comprising:
   (a) a tool magazine provided with a rotatable pot carrier carrying a plurality of tool pots, each of said tool pots adapted to hold a cutting tool with a tail end portion and swingable between a rest position and an operative position, said tool pot including,
      (i) a body swingably attached to said pot carrier and having an axial tapering bore, an axial end bore for reception of the tail end portion of the cutting tool and a plurality of radial holes each open into the axial end bore at their inner ends,
      (ii) means provided in the radial holes of said body for releasably gripping the tail end portion of the cutting tool, and
      (iii) locking means built to said body, said locking means comprising a slider fitted to one of the radial holes for sliding movement with respect to the tail end portion of the cutting tool, means pivoted to said body for pivotal movement between a locking position wherein said pivotal movement means pushes the slider radially inwards to lock the cutting tool and an unlocking position wherein said slider is allowed to move radially outwards to unlock the cutting tool, and means for normally urging said pivotal movement means into the locking position;
   (b) means for causing said tool pot to swing from the rest position to the operative position and vice versa;
   (c) means for allowing the locking means of said tool pot to unlock the cutting tool at the time said tool pot remains in the operative position; and
   (d) a changer arm for selectively removing the cutting tool out of said tool pot and inserting the cutting tool into said tool pot.

8. The automatic tool changer as recited in claim 7, wherein said gripping means comprises a gripper ball and a compression spring retained in a respective one of the radial holes of the body, said compression spring positioned radially outwardly of the gripper ball to normally bias the gripper ball into engagement with the tail end portion of the cutting tool.

9. The automatic tool changer as recited in claim 7, wherein said pivotal movement means is provided with a first arm portion kept in contact with said slider at its free end and a second arm portion extending in the opposite direction from the first arm portion with a length greater than that of the first arm portion.

10. The automatic tool changer as recited in claim 9, wherein said means for allowing the locking means of said tool pot to unlock the cutting tool is a stopper bolt which makes contact with the second arm portion when said tool pot is in the operative position.

\* \* \* \* \*